June 11, 1957 L. W. RICHARDSON 2,795,111
SUBTERRANEAN DITCHING APPARATUS
Filed July 1, 1953

INVENTOR.
L.W. Richardson
BY
C. M. McKnight
ATTORNEY

United States Patent Office 2,795,111
Patented June 11, 1957

2,795,111

SUBTERRANEAN DITCHING APPARATUS

Loyd W. Richardson, Aransas, Tex.

Application July 1, 1953, Serial No. 365,315

4 Claims. (Cl. 61—72)

This invention relates to the laying of submarine pipe lines and comprises a method or apparatus for ditching or embedding pipe lines under water which have been previously laid on the bed of a body of water.

It is frequently desired to lay pipe lines for water, gas and other fluids under water, for example, across the bed of a river, lake or swamp, or around the shore line of the ocean body. Considerable difficulty has been encountered with the formation of such submarine ditches because the pipe lines are often placed in position where they may be fouled by boats, anchors, fishing gear and the like.

The present invention is concerned with an apparatus for the disposition on a submerged pipe line and traveling therealong for digging a ditch beneath the pipe line in order that the pipe may fall thereinto with a substantially simultaneous covering up of the ditch as the pipe is disposed therein.

It is an important object of this invention to provide a ditching apparatus which is adapted to be disposed for longitudinal movement along a submerged pipe line and to dig a trench immediately below the pipe so that the pipe may be disposed therein.

And still a further object of this invention is to provide an apparatus for laying subterranean pipe which travels longitudinally along the pipe from an auxiliary source of motive power wherein the depth of the ditch is determined by the position of the plow member, and the speed with which the ditching apparatus is pulled.

And still a further object of this invention is to provide a ditching apparatus for the laying of subterranean pipe lines which is efficient and simple in operation and durable.

Other objects and advantages of the invention will be evident from the following detailed description, read in conjunction with the accompanying drawings, which illustrate my invention.

Figure 1:
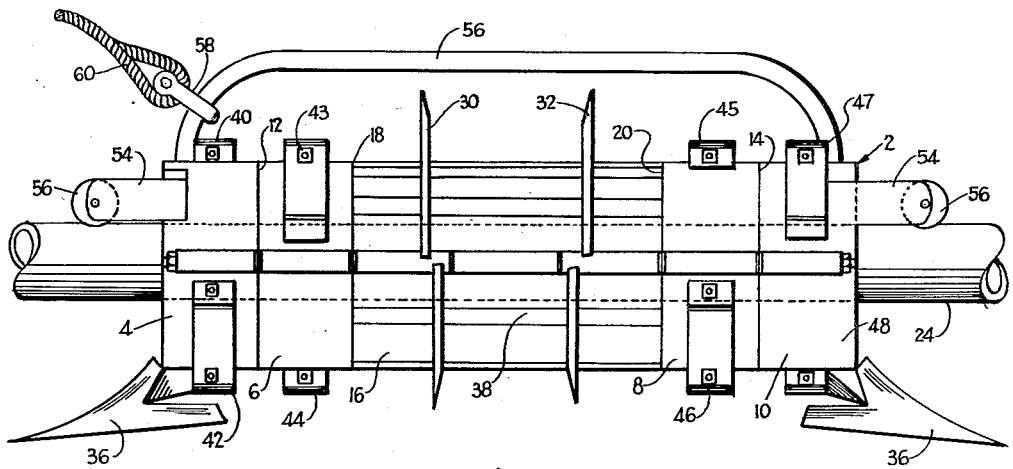
Figure 1 is a side elevational view of the apparatus utilized for forming the pipe line ditch.
Figure 2:
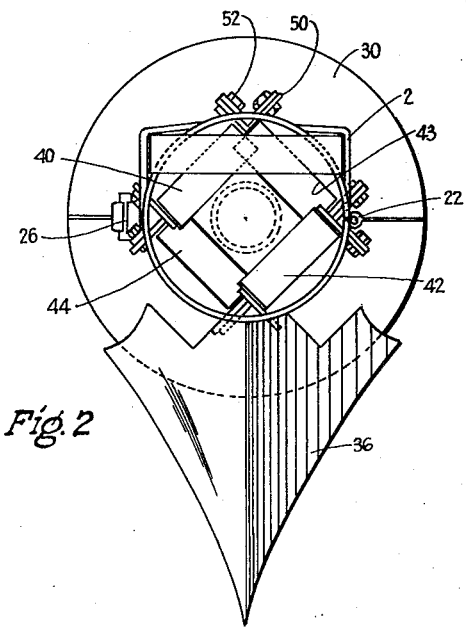
Figure 2 is an elevational view taken at one end of the apparatus shown in Fig. 1.

Referring to the drawings in detail, the pipe line apparatus or ditcher is designated by the reference character 2 and comprises a plurality of cylindrical metal sections 4, 6, 8 and 10. The sections 4 and 6 are welded together as at 12 in any suitable manner, while the sections 8 and 10 are similarly welded together at 14. These pairs of cylindrical sections are separated by a plurality of circumferentially disposed flat bar members 16 and are welded at one end 18 to the cylindrical pair 4—6 and at the other end 20 to the cylindrical pair 8—10 respectively, thereby providing a cage apparatus having the open center sections with the slats or bars 16. The entire unit 2 is sectional in that it is split in two and hinged at 22 in order to provide a ditcher that can be opened and disposed on a pipe 24 in a manner as will be hereinafter referred to. The sectional unit may be secured together by any suitable locking means such as a nut and bolt 26 (Fig. 2). A pair of sectional disc members 30 and 32 are secured in any suitable manner to the outer periphery of the spaced bars 16. The disc members 30 and 32 are also cut or split at the hinge line 22 (Figs. 1 and 2) diametrically there-across and the upper half of each disc is off-set along its longitudinal axis relative to the lower half in order to permit the halves to slide past each other when the ditcher unit 2 is opened for disposition around the pipe 24. The discs 30 and 32 are preferably washer shaped and act as scoops or drags to catch the dirt or mud from behind one of the plows 36 as it is deposited alongside the trench being dug, thereby forcing the dirt to enter the spaces 38 between the bars 16 and provide for a partial filling of the ditch as the ditcher moves therealong, all in a manner as will be hereinafter set forth. Further, the discs 30 and 32 help shape the trench being dug.

The cylindrical members 4 and 6 are each provided with a pair of rollers 40 and 42 and in similar manner unit 6 is provided with rollers 43 and 44. Also the units 8 and 10 are provided with rollers 45—46 and 47—48 respectively. As will be apparent from Fig. 1, the rollers 43 and 44 are disposed immediately behind the rollers 40 and 42 and in similar manner, the rollers 45 and 46 are behind the rollers 47 and 48 respectively. It will also be apparent from Fig. 2 that the rollers 43 and 44 are disposed at right angles to rollers 40 and 42, and in similar manner, the rollers 45 and 46 are disposed at right angles to 47—48 respectively, thereby assuring that rolling contact is made with the pipe at all times to assure efficient operation of the ditcher. The rollers are adjustable in their supporting brackets 50 by suitable nut and bolt means 52 in the usual manner in order that the proper adjustment can be made for various sizes of pipe inserted in the ditcher 2.

An outwardly extending bracket 54 is provided at each end of the machine and carries a guide roller 56 adapted to roll along the upper surface of the pipe 24 in the usual manner. All the rollers are preferably formed of rubber or other resilient material, thereby facilitating passage of the ditcher over pipe collars and the like without any injury to the ditcher or parts thereof.

It will be apparent that the plow members 36 are disposed at each end of the apparatus 2 and are substantially V-shaped in order to dig a trench in a manner as will be hereinafter set forth. The ditcher also has a handle or upper bar member 56 to facilitate handling of the ditcher on the pipe line. A hook member 58 is adapted to be connected with a drag rope or the like 60 in turn connected to a boat 62 in order that a source of motive power is provided for towing or moving the ditching apparatus along the bed of the body of water.

*Operation*

Figure 3:
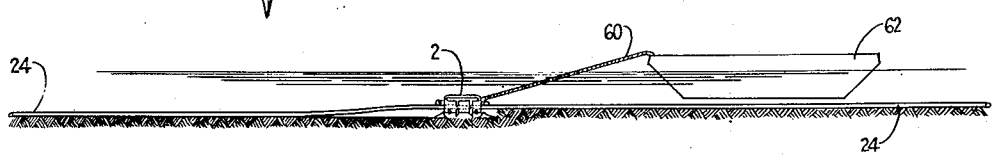
Figure 3 is a schematic elevational view showing an application of the apparatus in conjunction with a boat for propulsion thereof.

In operation the plow or ditcher 2 is usually carried out in a boat or the like into the water where the pipe 24 is to be laid. The ditcher apparatus 2 is disposed around the pipe and held by the lock means 26. It will be apparent that the roller arrangement 40 to 48, inclusive permits free longitudinal travel of the ditcher along the outer periphery of the pipe 24. With the ditcher 2 disposed on the pipe, the motive power is supplied by the boat 62 through the connecting rope 60 and will pull the ditcher along the subterranean bed whereby one of the plows 36 will dig a trench beneath the surface of the bed, as shown in Fig. 3. As the plow or ditcher 2 moves along the pipe, the length of the pipe suspension is sufficient to provide flexibility, whereupon the pipe 24 will be disposed in the ditch behind the movement of the plow.

The discs 30 and 32 act as scoops, or drags to catch the dirt, or mud being excavated by the plow members 36 and disposed behind and along the side of the trench to force this dirt between the slat members 16, thereby providing some filling action for the trench. Furthermore, it will be apparent that the washer shape or substantially annular configuration of the discs 30 and 32 provides for a shaping of the trench to an arcuate contour complementary with the outer periphery of the pipe being laid therein. The plows can be adjustable by any suitable means (not shown) in order to vary the depth of the ditch being dug. Furthermore, the depth is additionally controlled by the speed and pulling effort on the ditcher. The washing action of the water assists the disc members in filling the trench of the loosened dirt.

The rubber rollers will permit the ditcher to pass over pipe collars without any injury since they are flexible and also the rubber rollers will not scratch or distort any protective covering applied to the pipe, such as bitumen and the like. It will be apparent that the machines can vary in size to handle variable size pipe, for example, a machine for three to seven inch, another size for eight to twelve, and upward to larger sizes, dependent on the amount of pulling effort for the machine.

From the foregoing, it will be apparent that the present invention provides a ditching apparatus which can efficiently and conservatively dig a ditch in subterranean bed for the laying of pipe therein which travels along the pipe line during the digging operation, and yet permits a continuous disposition of the pipe into the ditch immediately behind the ditching action with an additional filling action substantially simultaneous therewith.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a subterranean ditching apparatus adapted to be propelled along a pipe comprising a frame, hinge means on the frame permitting opening and closing thereof facilitating disposition thereof around the pipe, a plurality of roller means longitudinally disposed in spaced relation on the frame for contact with the pipe, plow means in at least one end of the frame for digging a trench beneath the pipe, and means for catching the dirt excavated by the plow means during travel of the ditcher to assist in a partial filling and shaping of the trench to a contour complementary to the outer periphery of the pipe.

2. In a subterranean ditching apparatus adapted to be propelled along a pipe comprising a frame, means permitting opening and closing of the frame to facilitate disposition thereof around the pipe, a plurality of roller means longitudinally disposed in spaced relation on the frame for rolling contact with the pipe, said frame comprising a plurality of circumferentially spaced bars between a portion of the roller means, plow means disposed at both ends of the frame, said plow means adapted to dig a trench beneath the pipe during movement of the frame, a plurality of disc members surrounding the bar means, said disc members catching the dirt excavated by the plow means and directing it through the spaced bar members to assist in a partial filling of the trench and a shaping thereof complementary to the outer periphery of the pipe, and means for providing adjustment of the roller means for use on variable size pipe.

3. In a subterranean ditching apparatus adapted to be self-propelled on a pipe for simultaneously digging a trench for the laying of the pipe therein, comprising a frame member adapted to encircle the pipe, a plow member on the frame for digging a trench beneath the pipe, and means on the frame for catching the dirt excavated by the plow member to assist in a partial filling and a shaping of the trench to a contour complementary with the outer periphery of the pipe prior to the disposition of the pipe within the trench.

4. In a subterranean apparatus adapted to be propelled along a pipe, comprising a frame adapted to encircle the pipe, a plurality of roller means longitudinally disposed in spaced relation on the pipe for rolling contact therewith, said roller means between provided in sets of pairs with one set diametrically opposed to the other set to maintain an efficient propulsion of the frame along the pipe, said frame comprising a plurality of centrally disposed circumferentially spaced bars, a plurality of sectional disc members surrounding the bars, plow means disposed at both ends of the frame, one of said plow means adapted to dig a trench beneath the pipe during movement of the frame in one direction, said disc members catching the dirt excavated by the plow means and directing it through the spaced bar members to assist in a partial filling of the trench and a shaping thereof complementary with the contour of the pipe prior to the disposition of the pipe therein.

References Cited in the file of this patent

UNITED STATES PATENTS

| | | |
|---|---|---|
| 2,144,063 | Irvin | Jan. 17, 1939 |
| 2,602,300 | Collins | July 8, 1952 |
| 2,693,085 | Salnikov | Nov. 2, 1954 |